(12) United States Patent
Haralson et al.

(10) Patent No.: US 9,183,864 B1
(45) Date of Patent: Nov. 10, 2015

(54) DISK DRIVE ADJUSTING CLOSED-LOOP FLY HEIGHT TARGET BASED ON CHANGE IN OPEN-LOOP FLY HEIGHT CONTROL SIGNAL

(71) Applicant: Western Digital Technologies, Inc., Irvine, CA (US)

(72) Inventors: Phillip S. Haralson, Laguna Niguel, CA (US); Galvin T. Chia, Rancho Santa Margarita, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 213 days.

(21) Appl. No.: 13/927,109

(22) Filed: Jun. 25, 2013

Related U.S. Application Data

(60) Provisional application No. 61/834,798, filed on Jun. 13, 2013.

(51) Int. Cl.
*G11B 5/60* (2006.01)

(52) U.S. Cl.
CPC .................................... *G11B 5/6011* (2013.01)

(58) Field of Classification Search
None
See application file for complete search history.

(56) References Cited

U.S. PATENT DOCUMENTS

| | | | |
|---|---|---|---|
| 5,168,413 A | 12/1992 | Coker et al. | |
| 6,018,789 A | 1/2000 | Sokolov et al. | |
| 6,065,095 A | 5/2000 | Sokolov et al. | |
| 6,078,452 A | 6/2000 | Kittilson et al. | |
| 6,081,447 A | 6/2000 | Lofgren et al. | |
| 6,092,149 A | 7/2000 | Hicken et al. | |
| 6,092,150 A | 7/2000 | Sokolov et al. | |
| 6,094,707 A | 7/2000 | Sokolov et al. | |
| 6,105,104 A | 8/2000 | Guttmann et al. | |
| 6,111,717 A | 8/2000 | Cloke et al. | |
| 6,145,052 A | 11/2000 | Howe et al. | |
| 6,175,893 B1 | 1/2001 | D'Souza et al. | |
| 6,178,056 B1 | 1/2001 | Cloke et al. | |
| 6,191,909 B1 | 2/2001 | Cloke et al. | |
| 6,195,218 B1 | 2/2001 | Guttmann et al. | |
| 6,205,494 B1 | 3/2001 | Williams | |
| 6,208,477 B1 | 3/2001 | Cloke et al. | |
| 6,223,303 B1 | 4/2001 | Billings et al. | |
| 6,230,233 B1 | 5/2001 | Lofgren et al. | |
| 6,246,346 B1 | 6/2001 | Cloke et al. | |
| 6,249,393 B1 | 6/2001 | Billings et al. | |
| 6,256,695 B1 | 7/2001 | Williams | |
| 6,262,857 B1 | 7/2001 | Hull et al. | |
| 6,263,459 B1 | 7/2001 | Schibilla | |
| 6,272,694 B1 | 8/2001 | Weaver et al. | |
| 6,278,568 B1 | 8/2001 | Cloke et al. | |
| 6,279,089 B1 | 8/2001 | Schibilla et al. | |
| 6,289,484 B1 | 9/2001 | Rothberg et al. | |
| 6,292,912 B1 | 9/2001 | Cloke et al. | |
| 6,310,740 B1 | 10/2001 | Dunbar et al. | |
| 6,317,850 B1 | 11/2001 | Rothberg | |
| 6,327,106 B1 | 12/2001 | Rothberg | |
| 6,337,778 B1 | 1/2002 | Gagne | |
| 6,369,969 B1 | 4/2002 | Christiansen et al. | |

(Continued)

*Primary Examiner* — Wayne Young
*Assistant Examiner* — James L Habermehl

(57) ABSTRACT

A disk drive is disclosed comprising a head actuated over a disk, the head comprising a fly height actuator (FHA). A fly height of the head is measured, and a closed-loop fly height control signal is generated based on the measured fly height and a target fly height. The target fly height is adjusted based on a delta generated based on a change in an environmental condition, and an FHA control signal is applied to the FHA based on the closed-loop fly height control signal.

20 Claims, 4 Drawing Sheets

(56) References Cited

U.S. PATENT DOCUMENTS

| | | |
|---|---|---|
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,102 B1 | 2/2003 | Smith et al. |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |

(56) References Cited

U.S. PATENT DOCUMENTS

| | | |
|---|---|---|
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,180,692 B1 | 2/2007 | Che et al. |
| 7,190,543 B2 * | 3/2007 | Suk .................. 360/69 |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,212,361 B1 | 5/2007 | Pederson et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,468,856 B2 * | 12/2008 | Fitzpatrick et al. ............ 360/75 |
| 7,471,483 B1 | 12/2008 | Ferris et al. |
| 7,471,486 B1 | 12/2008 | Coker et al. |
| 7,477,470 B2 * | 1/2009 | Leis et al. .................. 360/75 |
| 7,483,234 B2 * | 1/2009 | Shimozato .................. 360/75 |
| 7,486,060 B1 | 2/2009 | Bennett |
| 7,492,543 B2 * | 2/2009 | Mitsunaga et al. ............ 360/75 |
| 7,496,493 B1 | 2/2009 | Stevens |
| 7,508,616 B2 | 3/2009 | Fitzpatrick et al. |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,675,707 B1 | 3/2010 | Liu et al. |
| 7,688,540 B1 | 3/2010 | Mei et al. |
| 7,706,098 B2 * | 4/2010 | Sato .................. 360/75 |
| 7,724,461 B1 | 5/2010 | McFadyen et al. |
| 7,725,584 B1 | 5/2010 | Hanmann et al. |
| 7,729,080 B2 | 6/2010 | Suzuki |
| 7,730,295 B1 | 6/2010 | Lee |
| 7,760,458 B1 | 7/2010 | Trinh |
| 7,760,462 B2 * | 7/2010 | Shibasaki .................. 360/75 |
| 7,768,776 B1 | 8/2010 | Szeremeta et al. |
| 7,787,207 B2 * | 8/2010 | Takahashi .................. 360/75 |
| 7,804,657 B1 | 9/2010 | Hogg et al. |
| 7,808,738 B2 * | 10/2010 | Mitsunaga et al. ............ 360/75 |
| 7,808,740 B2 * | 10/2010 | Tanabe .................. 360/75 |
| 7,813,954 B1 | 10/2010 | Price et al. |
| 7,817,371 B2 | 10/2010 | Bolasna et al. |
| 7,827,320 B1 | 11/2010 | Stevens |
| 7,839,588 B1 | 11/2010 | Dang et al. |
| 7,839,595 B1 * | 11/2010 | Chue et al. .................. 360/75 |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,916,420 B1 | 3/2011 | McFadyen et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,957,086 B2 * | 6/2011 | Lee et al. .................. 360/59 |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,009,380 B2 * | 8/2011 | Matsushita et al. ............ 360/75 |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,059,357 B1 | 11/2011 | Knigge et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |

(56) References Cited

U.S. PATENT DOCUMENTS

| | | |
|---|---|---|
| 8,139,301 B1 | 3/2012 | Li et al. |
| 8,139,308 B2 * | 3/2012 | Kim et al. ................ 360/75 |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,169,734 B2 * | 5/2012 | Tsunoda et al. ................ 360/75 |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,254,051 B2 | 8/2012 | Kuramoto |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,300,338 B1 | 10/2012 | McFadyen |
| 8,300,349 B2 | 10/2012 | Mathew et al. |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,320,069 B1 * | 11/2012 | Knigge et al. ................ 360/75 |
| 8,324,974 B1 | 12/2012 | Bennett |
| 8,325,432 B2 | 12/2012 | Mathew et al. |
| 8,332,695 B2 | 12/2012 | Dalphy et al. |
| 8,339,919 B1 | 12/2012 | Lee |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,416,521 B2 * | 4/2013 | Kondo ................ 360/75 |
| 8,417,566 B2 | 4/2013 | Price et al. |
| 8,421,663 B1 | 4/2013 | Bennett |
| 8,422,172 B1 | 4/2013 | Dakroub et al. |
| 8,427,770 B1 | 4/2013 | O'Dell et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,441,909 B1 | 5/2013 | Thayamballi et al. |
| 8,456,980 B1 | 6/2013 | Thayamballi |
| 8,458,526 B2 | 6/2013 | Dalphy et al. |
| 8,462,466 B2 | 6/2013 | Huber |
| 8,467,151 B1 | 6/2013 | Huber |
| 8,483,027 B1 | 7/2013 | Mak et al. |
| 8,489,841 B1 | 7/2013 | Strecke et al. |
| 8,493,679 B1 | 7/2013 | Boguslawski et al. |
| 8,499,198 B1 | 7/2013 | Messenger et al. |
| 8,514,506 B1 | 8/2013 | Li et al. |
| 8,554,741 B1 | 10/2013 | Malina |
| 8,560,759 B1 | 10/2013 | Boyle et al. |
| 8,576,509 B1 | 11/2013 | Hogg |
| 8,576,511 B1 | 11/2013 | Coker et al. |
| 8,578,100 B1 | 11/2013 | Huynh et al. |
| 8,578,242 B1 | 11/2013 | Burton et al. |
| 8,582,223 B1 | 11/2013 | Garani et al. |
| 8,582,231 B1 | 11/2013 | Kermiche et al. |
| 8,589,773 B1 | 11/2013 | Wang et al. |
| 8,593,753 B1 | 11/2013 | Anderson |
| 8,599,512 B2 | 12/2013 | Hogg |
| 8,605,379 B1 | 12/2013 | Sun |
| 8,611,031 B1 | 12/2013 | Tan et al. |
| 8,611,032 B2 | 12/2013 | Champion et al. |
| 8,612,798 B1 | 12/2013 | Tsai |
| 8,619,383 B1 | 12/2013 | Jung et al. |
| 8,619,508 B1 | 12/2013 | Krichevsky et al. |
| 8,619,529 B1 | 12/2013 | Liew et al. |
| 8,621,115 B1 | 12/2013 | Bombet et al. |
| 8,621,133 B1 | 12/2013 | Boyle |
| 8,625,224 B1 | 1/2014 | Lin et al. |
| 8,625,225 B1 | 1/2014 | Wang |
| 8,626,463 B2 | 1/2014 | Stevens et al. |
| 8,630,052 B1 | 1/2014 | Jung et al. |
| 8,631,188 B1 | 1/2014 | Heath et al. |
| 8,635,412 B1 | 1/2014 | Wilshire |
| 8,661,193 B1 | 2/2014 | Cobos et al. |
| 8,665,547 B1 | 3/2014 | Yeo et al. |
| 8,667,248 B1 | 3/2014 | Neppalli |
| 8,670,205 B1 | 3/2014 | Malina et al. |
| 8,671,250 B2 | 3/2014 | Lee |
| 8,681,442 B2 | 3/2014 | Hogg |
| 8,681,445 B1 | 3/2014 | Kermiche et al. |
| 8,683,295 B1 | 3/2014 | Syu et al. |
| 8,687,306 B1 | 4/2014 | Coker et al. |
| 8,687,307 B1 | 4/2014 | Patton, III |
| 8,687,313 B2 | 4/2014 | Selvaraj |
| 8,693,133 B1 | 4/2014 | Lee et al. |
| 8,698,492 B1 | 4/2014 | Mak et al. |
| 8,699,171 B1 | 4/2014 | Boyle |
| 8,699,172 B1 | 4/2014 | Gunderson et al. |
| 8,730,602 B2 * | 5/2014 | Yang ................ 360/75 |
| 8,730,610 B2 * | 5/2014 | McFadyen et al. ............. 360/75 |
| 8,767,339 B2 * | 7/2014 | Zeng et al. ................ 360/75 |
| 8,786,977 B2 * | 7/2014 | Setiadi et al. ................ 360/75 |
| 8,873,191 B2 * | 10/2014 | Li et al. ................ 360/75 |
| 8,922,939 B1 * | 12/2014 | Knigge et al. ................ 360/75 |
| 2007/0268615 A1 | 11/2007 | McFadyen et al. |
| 2008/0247078 A1 * | 10/2008 | Yao et al. ................ 360/75 |
| 2009/0027800 A1 * | 1/2009 | Iwamoto et al. ................ 360/75 |
| 2009/0113702 A1 | 5/2009 | Hogg |
| 2009/0195912 A1 | 8/2009 | Sato |
| 2010/0208387 A1 * | 8/2010 | Ehrlich ................ 360/97.02 |
| 2010/0306551 A1 | 12/2010 | Meyer et al. |
| 2011/0226729 A1 | 9/2011 | Hogg |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |
| 2013/0003216 A1 * | 1/2013 | Yamane ................ 360/59 |

* cited by examiner

DISK DRIVE ADJUSTING CLOSED-LOOP FLY HEIGHT TARGET BASED ON CHANGE IN OPEN-LOOP FLY HEIGHT CONTROL SIGNAL

CROSS-REFERENCE TO RELATED APPLICATIONS

This application claims priority to provisional U.S. Patent Application Ser. No. 61/834,798, filed on Jun. 13, 2013, which is hereby incorporated by reference in its entirety.

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a VCM servo controller to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., VCM) in order to actuate the head radially over the disk in a direction that reduces the PES.

An air bearing forms between the head and the disk due to the disk rotating at high speeds. Since the quality of the write/read signal depends on the fly height of the head, conventional heads (e.g., a magnetoresistive heads) may comprise an actuator for controlling the fly height. Any suitable fly height actuator may be employed, such as a heater which controls fly height through thermal expansion, or a piezoelectric (PZT) actuator. A dynamic fly height (DFH) servo controller may measure the fly height of the head and adjust the fly height actuator to maintain a target fly height during write/read operations.

DETAILED DESCRIPTION

Figure 1:
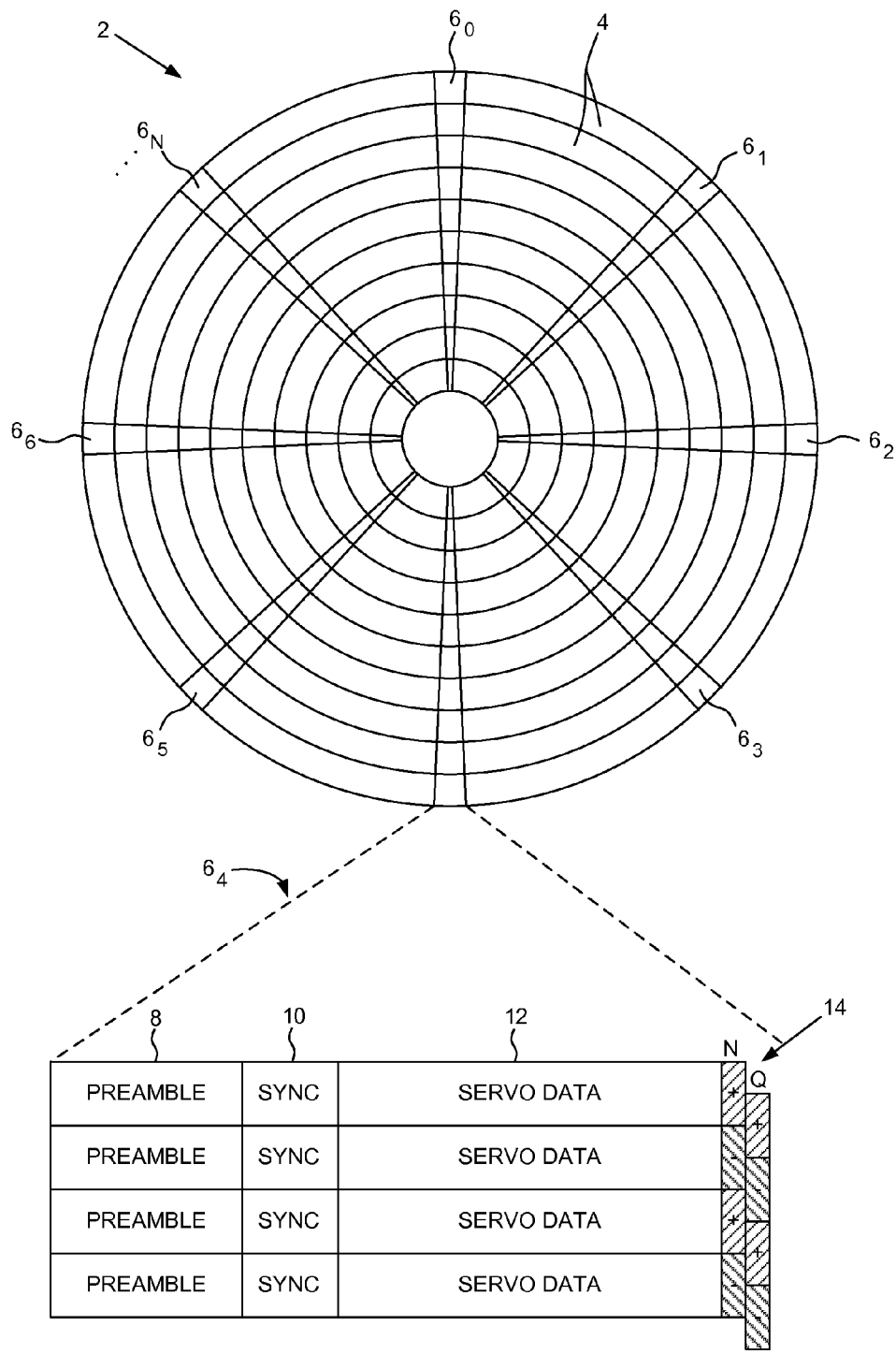
FIG. 1 shows a prior art disk format comprising a plurality of servo tracks defined by servo sectors.
Figure 2:
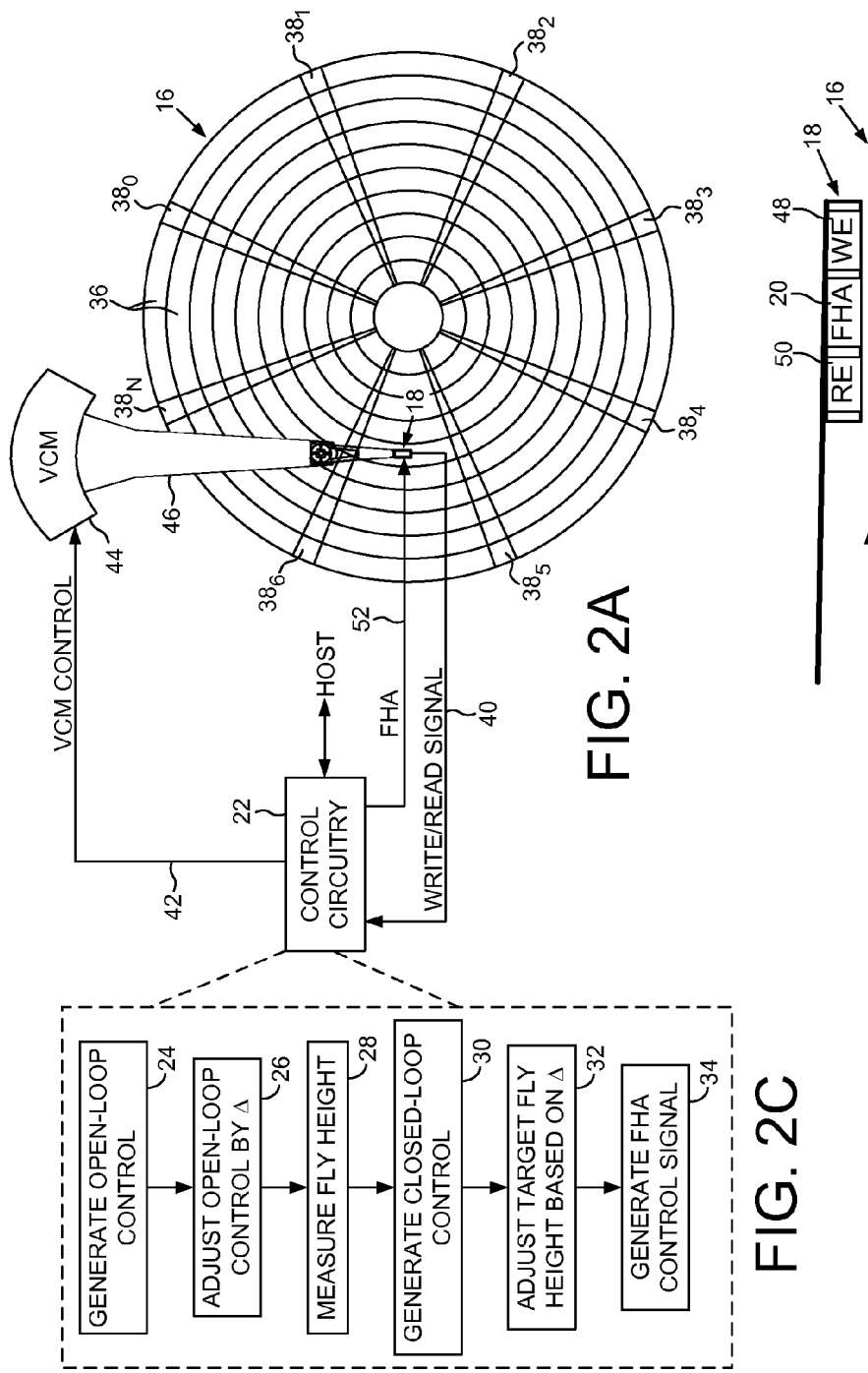
FIG. 2A shows a disk drive according to an embodiment comprising control circuitry operable to actuate a head over a disk.
FIG. 2B shows a head according to an embodiment comprising a read element, a write element, and a fly height actuator (FHA).
FIG. 2C is a flow diagram according to an embodiment wherein a closed-loop fly height target is adjusted based on a change in an open-loop fly height control signal.

FIG. 2A shows a disk drive according to an embodiment comprising a disk 16, and a head 18 actuated over the disk 16, the head 18 comprising a fly height actuator (FHA) 20 (FIG. 2B). The disk drive further comprises control circuitry 22 operable to execute the flow diagram of FIG. 2C, wherein an open-loop fly height control signal is generated (block 24) and adjusted by a delta based on a change in an environmental condition (block 26). A fly height of the head is measured (block 28), and a closed-loop fly height control signal is generated based on the measured fly height and a target fly height (block 30). The target fly height is adjusted based on the delta (block 32), and an FHA control signal is applied to the FHA based on the open-loop fly height control signal and the closed-loop fly height control signal (block 34).

In the embodiment of FIG. 2A, the disk 16 comprises a plurality of servo tracks 36 defined by servo sectors $38_0$-$38_N$, wherein data tracks are defined relative to the servo tracks at the same or different radial density. The control circuitry 22 processes a read signal 40 emanating from the head 18 to demodulate the servo sectors $38_0$-$38_N$ and generate a position error signal (PES) representing an error between the actual position of the head and a target position relative to a target track. The control circuitry 22 filters the PES using a suitable compensation filter to generate a control signal 42 applied to a voice coil motor (VCM) 44 which rotates an actuator arm 46 about a pivot in order to actuate the head 18 radially over the disk 16 in a direction that reduces the PES. The servo sectors $38_0$-$38_N$ may comprise any suitable head position information, such as a track address for coarse positioning and servo bursts for fine positioning. The servo bursts may comprise any suitable pattern, such as an amplitude based servo pattern or a phase based servo pattern.

In the embodiment of FIG. 2B, the head 18 comprises a suitable write element 48, such as an inductive coil, and a suitable read element 50, such as a magnetoresistive element. The head 18 may comprise any suitable FHA 20, such as a heater that actuates through thermal expansion, or a piezoelectric actuator that actuates through mechanical deflection, in response to an FHA control signal 52 generated by the control circuitry 22.

Figure 3:
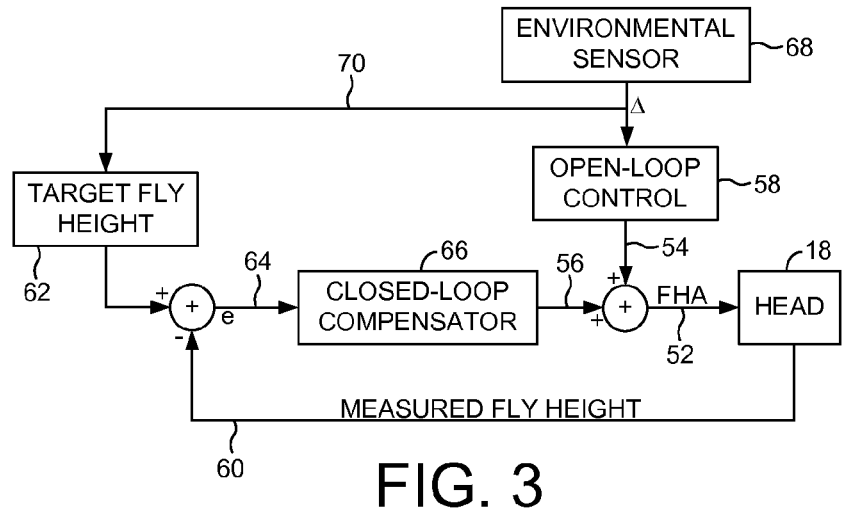
FIG. 3 shows control circuitry according to an embodiment for generating a FHA control signal by adding the open-loop control signal to a closed-loop control signal.
Figure 4:
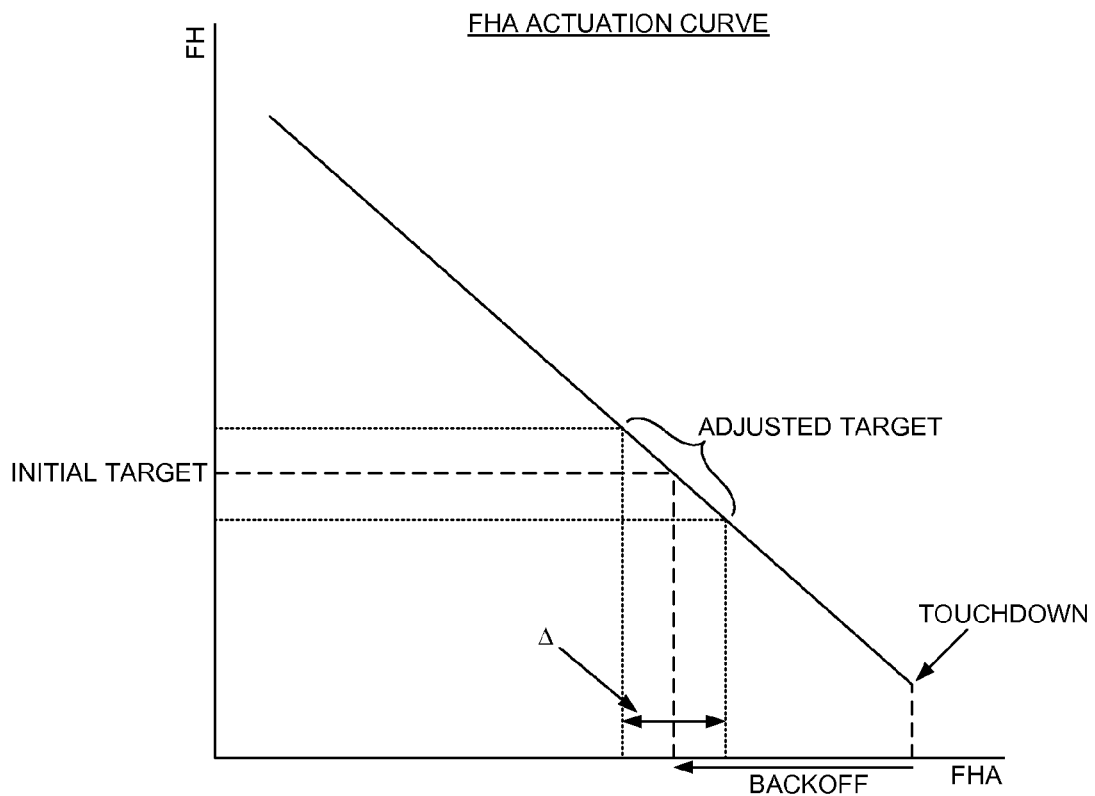
FIG. 4 illustrates an embodiment wherein the open-loop control signal is generated by executing a touchdown calibration procedure wherein the FHA control signal is increased until the head touching down onto the disk is detected.

FIG. 3 shows control circuitry according to an embodiment for generating the FHA control signal 52 by adding an open-loop control signal 54 to a closed-loop control signal 56. An open-loop control block 58 generates the open-loop control signal 54 in any suitable manner. FIG. 4 illustrates an embodiment wherein the open-loop control signal 56 is generated by executing a touchdown calibration procedure wherein the FHA control signal 52 is increased until the head 18 touching down onto the disk 16 is detected. The open-loop control signal 56 is then generated by backing off the FHA touch-down setting by an offset. In one embodiment, the fly height of the head 18 is measured during the touchdown calibration procedure at each increment of the FHA control signal 52 in order to generate an FHA actuation curve as shown in FIG. 4. In this manner, the measured fly height that corresponds to the backoff setting shown in FIG. 4 becomes an initial target fly height. During normal operation, the fly height of the head is measured and the measured fly height 60 is subtracted from the target fly height 62 to generate a fly height error 64. A closed-loop compensator 66 filters the fly height error 64 to generate the closed-loop control signal 56 that is added to the open-loop control signal 54 to generate the FHA control signal 52.

In one embodiment, the open-loop target fly height for the head may change due to a change in an environmental condition, such as a change in temperature, humidity, altitude (pressure), shock, or any other environmental condition. For example, if the ambient temperature of the disk drive falls, the open-loop target fly height may be decreased to compensate for a reduced overwrite performance. If the ambient temperature of the disk drive rises, the open-loop target fly height may be increased for heads that exhibit degradation at higher temperature, thereby increasing the life of these heads by reducing head wear. Accordingly, in one embodiment the control circuitry 22 may measure a characteristic of each head (e.g., overwrite performance or degradation with temperature) and generate the delta for each head based on the measured characteristic.

In one embodiment, the open-loop target fly height is adjusted by making a corresponding adjustment to the open-loop control signal 54. FIG. 3 shows an embodiment wherein an environmental sensor 68 monitors an environmental condition, such as temperature, and when there is a change in the environmental condition, the open-loop control signal 54 is adjusted by a delta 70 based on the change in the environmental condition. The delta 70 adjustment to the open-loop control signal 54 is also used to make a corresponding adjustment to the target fly height 62 for the closed-loop control system. Referring again to FIG. 4, in one embodiment the delta adjustment to the open-loop control signal corresponds to a change in fly height in the FHA actuation curve. Accordingly, in one embodiment the control circuitry 22 is operable to initialize the target fly height 62 based on a nominal value for the environmental condition and a corresponding target value for the FHA control signal in the actuation curve. When the environmental condition changes, the target value for the FHA control signal is adjusted by the delta, and the target fly height 62 is adjusted based on the adjusted target value for the FHA control signal in the FHA actuation curve as illustrated in FIG. 4.

Figure 5:
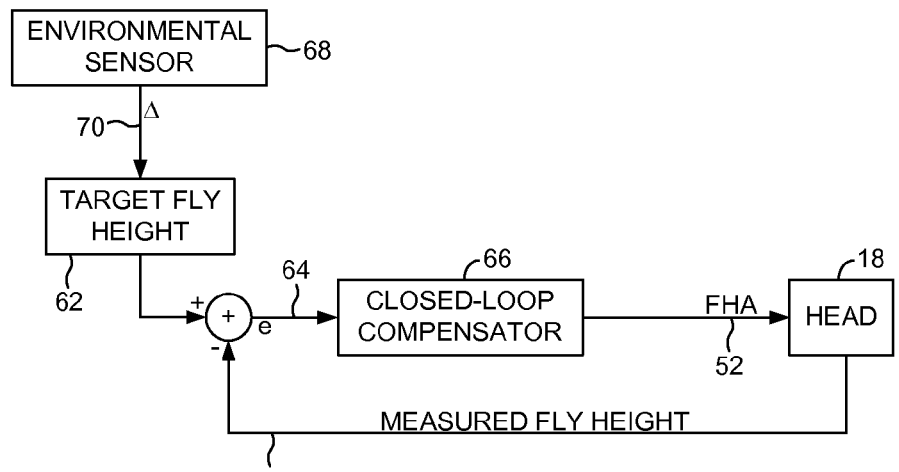
FIG. 5 shows control circuitry according to an embodiment for generating a FHA control signal based on a closed-loop control signal that is generated based on an adjustable fly height target in response to a change in an environmental condition.

FIG. 5 shows control circuitry according to an embodiment for generating the FHA control signal 52 based on a closed-loop control signal 56 that is generated based on an adjustable fly height target 62 in response to a change in an environmental condition. That is, a delta 70 is generated based on the environmental sensor 68 and the delta 70 used to adjust the target fly height 62. Accordingly, in this embodiment the fly height of the head 18 may be controlled using the closed-loop control without the open-loop control shown in FIG. 3. In yet another embodiment, the control circuitry may generate an open-loop control signal 54 as shown in FIG. 3 by executing the touchdown procedure described above with reference to FIG. 4, wherein the delta 70 may be used to adjust the target fly height 62 as shown in FIG. 5 without making a corresponding adjustment to the open-open loop control signal 54. In one embodiment, the open-loop control may be implemented in FIG. 5 by initializing an integrator in the closed-loop compensator 66 using the FHA control signal 52 calibrated using the above-described touchdown procedure.

Any suitable technique may be employed to generate the fly height measurement 60 in FIG. 3 as well as when generating the FHA actuation curve of FIG. 4. For example, a known technique for measuring the fly height is a harmonic ratio technique (Wallace spacing equation) that measures an absolute head-media spacing (HMS) according to the ratio of the amplitude of the read signal at two different harmonics while reading a periodic pattern from the disk 2 (e.g., a pattern recorded in a servo sector). In one embodiment, this harmonic ratio can be generated by reading a periodic pattern at two different frequencies (e.g., a 2T and 6T pattern).

Figure 6A:
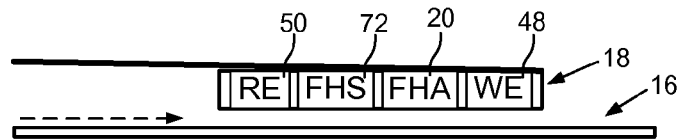
FIG. 6A shows a head according to an embodiment further comprising a fly height sensor (FHS).
Figure 6B:
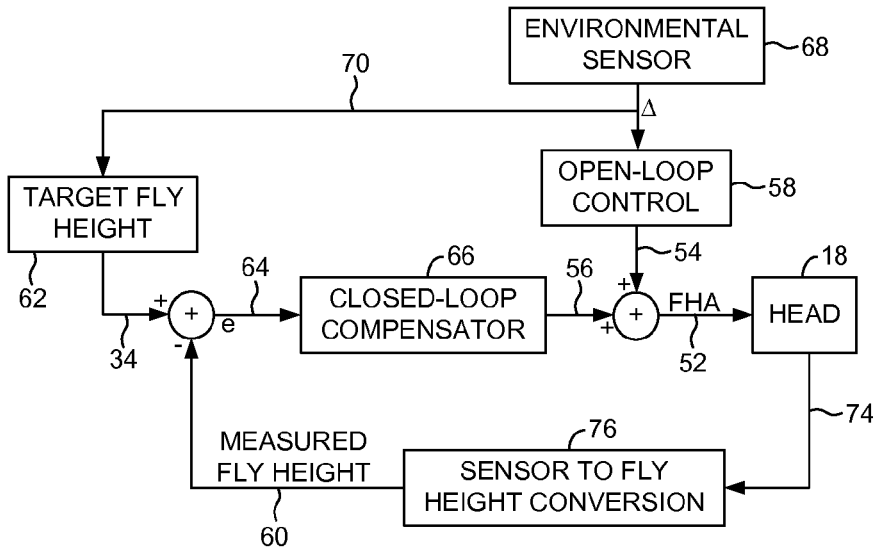
FIG. 6B shows control circuitry according to an embodiment wherein the fly height sensor generates a fly height signal in first units (e.g., volts) which is converted into the measured fly height in second units (e.g., nm).

In another embodiment shown in FIG. 6A, the head 18 may comprise a suitable fly height sensor 72, such as a suitable temperature sensitive sensor (e.g., a suitable magnetoresistive element having a thermal coefficient of resistance (TCR)), or a suitable capacitive element. FIG. 6B shows control circuitry according to an embodiment wherein the fly height sensor 72 generates a fly height signal 74 in first units (e.g., volts) which is converted by conversion block 76 into the measured fly height 60 in second units (e.g., nm).

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. A disk drive comprising:
    a disk;
    a head actuated over the disk, the head comprising a fly height actuator (FHA); and
    control circuitry operable to:
        measure a fly height of the head;
        generate a closed-loop fly height control signal based on the measured fly height and a target fly height;
        adjust the target fly height based on a delta generated based on a change in an environmental condition; and
        generate an FHA control signal applied to the FHA based on the closed-loop fly height control signal.

2. The disk drive as recited in claim 1, wherein the control circuitry is operable to:
    generate an open-loop fly height control signal;
    adjust the open-loop fly height control signal by the delta; and
    generate the FHA control signal applied to the FHA based on the open-loop fly height control signal and the closed-loop fly height control signal.

3. The disk drive as recited in claim 1, wherein the environmental condition comprises at least one of a temperature, humidity, altitude, and shock.

4. The disk drive as recited in claim 1, wherein the control circuitry is further operable to generate an FHA actuation curve by measuring the fly height of the head for different values of the FHA control signal.

5. The disk drive as recited in claim 4, wherein the control circuitry is operable to initialize the target fly height based on a nominal value for the environmental condition and the FHA actuation curve.

6. The disk drive as recited in claim 4, wherein the control circuitry is operable to adjust the target fly height based on the delta and the FHA actuation curve.

7. The disk drive as recited in claim 6, wherein the control circuitry is operable to:
    initialize the target fly height based on a nominal value for the environmental condition and a corresponding target value for the FHA control signal in the FHA actuation curve;
    adjust the target value for the FHA control signal by the delta when the environmental condition changes; and
    adjust the target fly height based on the adjusted target value for the FHA control signal in the FHA actuation curve.

8. The disk drive as recited in claim 1, wherein the control circuitry is operable to measure the fly height of the head by reading a periodic pattern from the disk.

9. The disk drive as recited in claim 1, wherein the head further comprises a fly height sensor and the control circuitry is operable to measure the fly height of the head based on the fly height sensor.

10. The disk drive as recited in claim 1, wherein the control circuitry is further operable to:
    measure a characteristic of the head; and
    generate the delta based on the measured characteristic.

11. A method of operating a disk drive comprising a head actuated over a disk, the head comprising a fly height actuator (FHA), the method comprising:
    measuring a fly height of the head;
    generating a closed-loop fly height control signal based on the measured fly height and a target fly height;
    adjusting the target fly height based on a delta generated based on a change in an environmental condition; and
    generating an FHA control signal applied to the FHA based on the closed-loop fly height control signal.

12. The method as recited in claim 11, further comprising:
    generating an open-loop fly height control signal;
    adjusting the open-loop fly height control signal by the delta; and
    generating the FHA control signal applied to the FHA based on the open-loop fly height control signal and the closed-loop fly height control signal.

13. The method as recited in claim 11, wherein the environmental condition comprises at least one of a temperature, humidity, altitude, and shock.

14. The method as recited in claim 11, further comprising generating an FHA actuation curve by measuring the fly height of the head for different values of the FHA control signal.

15. The method as recited in claim 14, further comprising initializing the target fly height based on a nominal value for the environmental condition and the FHA actuation curve.

16. The method as recited in claim 14, further comprising adjusting the target fly height based on the delta and the FHA actuation curve.

17. The method as recited in claim 16, further comprising:
    initializing the target fly height based on a nominal value for the environmental condition and a corresponding target value for the FHA control signal in the FHA actuation curve;
    adjusting the target value for the FHA control signal by the delta when the environmental condition changes; and
    adjusting the target fly height based on the adjusted target value for the FHA control signal in the FHA actuation curve.

18. The method as recited in claim 11, further comprising measuring the fly height of the head by reading a periodic pattern from the disk.

19. The method as recited in claim 11, wherein the head further comprises a fly height sensor and the method further comprises measuring the fly height of the head based on the fly height sensor.

20. The method as recited in claim 11, further comprising:
    measuring a characteristic of the head; and
    generating the delta based on the measured characteristic.

* * * * *